US009873453B2

(12) United States Patent
Shah et al.

(10) Patent No.: US 9,873,453 B2
(45) Date of Patent: Jan. 23, 2018

(54) DRIVER HANDS-ON STEERING WHEEL DETECT USING EPS SIGNALS

(71) Applicant: Steering Solutions IP Holding Corporation, Saginaw, MI (US)

(72) Inventors: Shrenik P. Shah, Saginaw, MI (US); Chang Wang, Saginaw, MI (US); Mariam Swetha George, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/130,003

(22) Filed: Apr. 15, 2016

(65) Prior Publication Data
US 2017/0297618 A1    Oct. 19, 2017

(51) Int. Cl.
*B62D 11/00* (2006.01)
*B62D 6/10* (2006.01)
*B62D 1/04* (2006.01)
*B62D 5/04* (2006.01)
*B62D 6/00* (2006.01)

(52) U.S. Cl.
CPC ............... *B62D 6/10* (2013.01); *B62D 1/046* (2013.01); *B62D 5/0481* (2013.01); *B62D 6/00* (2013.01)

(58) Field of Classification Search
CPC . B62D 1/06; B62D 6/10; B62D 1/046; B62D 5/0481; B62D 6/00
USPC ...................................... 701/36, 41
See application file for complete search history.

(56) References Cited

U.S. PATENT DOCUMENTS

2005/0006170 A1\* 1/2005 Dirrig ..................... B62D 1/06
180/446

\* cited by examiner

*Primary Examiner* — Gertrude Arthur JeanGlaude
(74) *Attorney, Agent, or Firm* — Cantor Colburn LLP

(57) ABSTRACT

A system for detecting handwheel control comprises a driver torque estimation module that estimates a driver torque state based on a plurality of electric power steering signals; and a grip detection module that determines one of a grip level, a hands-on wheel flag, and a transition blending factor from the driver torque state, the grip level is used to control a driver assist power steering system.

17 Claims, 5 Drawing Sheets

DRIVER HANDS-ON STEERING WHEEL DETECT USING EPS SIGNALS

BACKGROUND OF THE INVENTION

Various advanced driver assistance systems (ADAS) algorithms may require knowledge of when a driver's hands are on a steering wheel. Driver contact with a steering wheel is an indication of driver intent to take control back from the car. For various ADAS applications, steering follows a certain steering angle trajectory to guide the car on an appropriate path, and in such cases driver's hands are off the steering wheel. In these scenarios, when driver decides to override the car's path in light of some danger or the driver plans to stop the maneuver abruptly, the decision must be communicated to the car in a timely and intuitive manner Putting hands back on the steering wheel can be one such way to indicate driver's intention to take back control of a vehicle. Thus, it is important to detect a driver intervention with the handwheel.

SUMMARY OF THE INVENTION

A system for detecting handwheel control comprises a driver torque estimation module that estimates a driver torque state based on a plurality of electric power steering signals; and a grip detection module that determines one of a grip level, a hands-on wheel flag, and a transition blending factor from the driver torque state, the transition blending factor facilitates a transition of the power steering system from a position control mode to a torque control mode.

A detection system for detecting driver handwheel control, the detection system being implemented in an advanced driver assistance system, the detection system comprises a driver torque estimation module that estimates a driver torque state based on a plurality of electric power steering signals; and a grip detection module that determines one of a grip level, a hands-on wheel flag, and a transition blending factor from the driver torque state, the transition blending factor facilitates a transition of the power steering system from a position control mode to a torque control mode.

A method for detecting handwheel control by a driver comprising estimating a driver torque state based on a plurality of electric power steering signals; and determining one of a grip level, a hands-on wheel flag, and a transition blending factor from the driver torque state, the transition blending factor facilitates a transition of the power steering system from a position control mode to a torque control mode.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
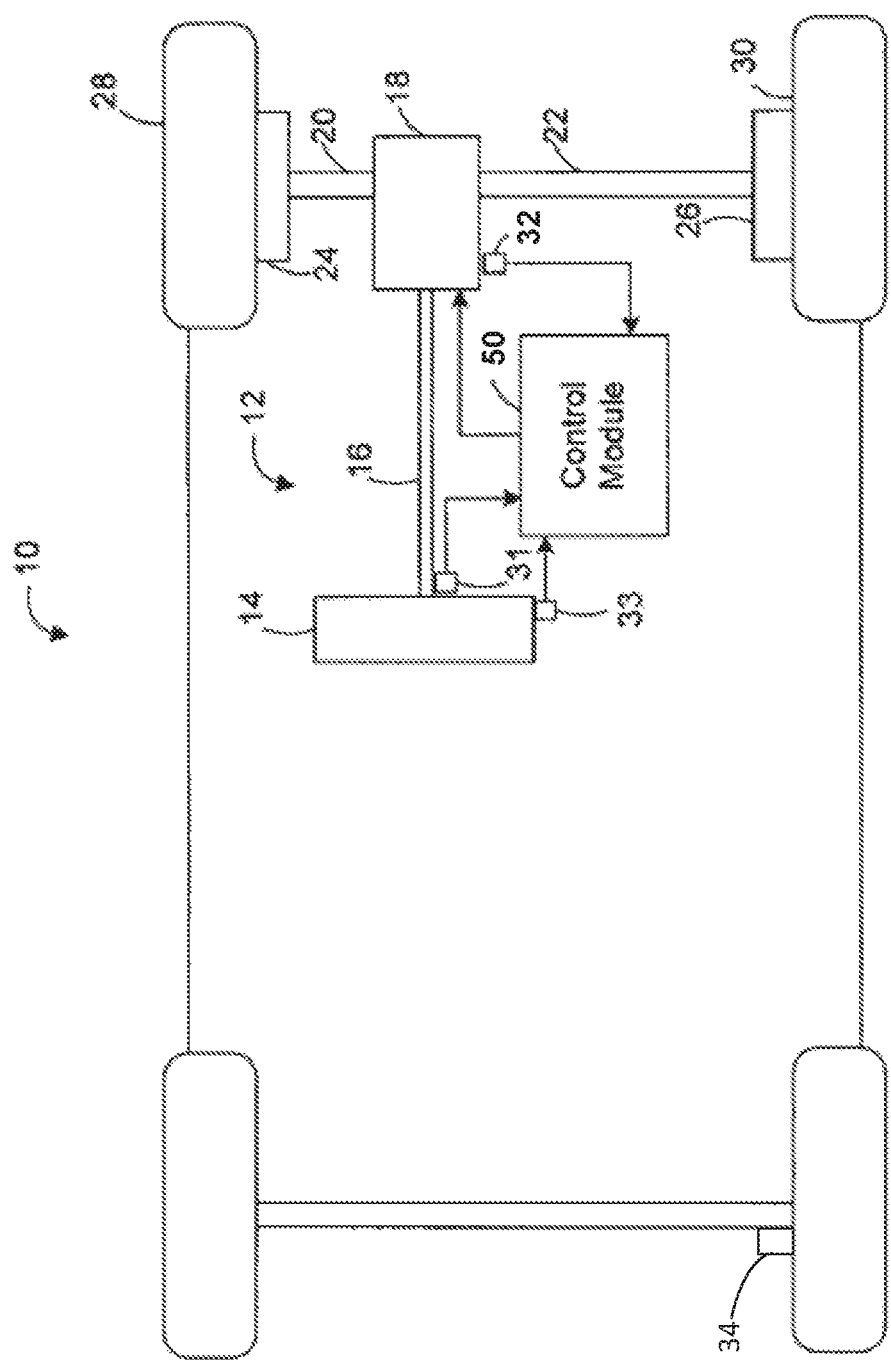
FIG. 1 illustrates a functional block diagram illustrating a vehicle including a steering system in accordance with some embodiments.

Referring now to the Figures, where the invention will be described with reference to specific embodiments, without limiting same, an exemplary embodiment of a vehicle 10 including a steering system 12 is illustrated. In various embodiments, the steering system 12 includes a handwheel 14 coupled to a steering shaft 16. In the exemplary embodiment shown, the steering system 12 is an electric power steering (EPS) system that further includes a steering assist unit 18 that couples to the steering shaft 16 of the steering system 12 and to a left tie rod 20 and a right tie rod 22 of the vehicle 10. It should be noted that the steering system 12 may be a rack assist EPS (REPS) as well. The steering assist unit 18 includes, for example, a rack and pinion steering mechanism (not shown) that may be coupled through the steering shaft 16 to a steering actuator motor and gearing. During operation, as the handwheel 14 is turned by a vehicle operator, the motor of the steering assist unit 18 provides the assistance to move the left tie rod 20 and the right tie rod 22 which in turn moves left and right steering knuckles 24, 26, respectively. The left knuckle 24 is coupled to a left roadway wheel 28, and the right knuckle 26 is coupled to a right roadway wheel 30 of the vehicle 10.

As shown in FIG. 1, the vehicle 10 further includes various sensors 31-34 that detect and measure signals of the steering system 12 and/or of the vehicle 10. The sensors generate sensor signals based on the measured signals. In one embodiment, a torque sensor 31 is provided for sensing a torque placed on the handwheel 14. In the exemplary embodiment as shown, the torque sensor 31 is placed on the hand wheel 14, however it is to be understood that the torque sensor 31 may not always be placed near or on the hand wheel 14. In one embodiment, the motor position/velocity sensor 32 senses motor position and/or velocity, and the handwheel position/velocity sensor 33 senses handwheel position and/or velocity. In addition, the vehicle 10 may include a wheel speed sensor 34 to assist in measuring vehicle speed. In the embodiment shown in FIG. 1, a single wheel speed sensor 34 is attached near a rear wheel of the vehicle 10. Although a single wheel speed sensor 34 is shown in FIG. 1, a plurality of wheel speed sensors may also be included. The wheel speed sensor 34 may be located on a transmission case and be driven by an output gear of a transmission of the vehicle 10.

A control module 50 controls the operation of the steering system 12 based on one or more of the sensor signals and further based on the steering control systems and methods of the present disclosure. In one embodiment, the control module 50 includes a driver torque estimation module 60. The driver torque estimation module 60 receives input signals that are measured signals of the EPS system. The driver torque estimation module 60 may estimate a driver torque based on the input signals received from a plurality of sensors, for example. The input signals can include but are not limited to a motor command, a t-bar torque signal as measured by the torque sensor 31 on the pinion or handwheel 14, a motor position signal and a motor velocity signal.

Figure 2:
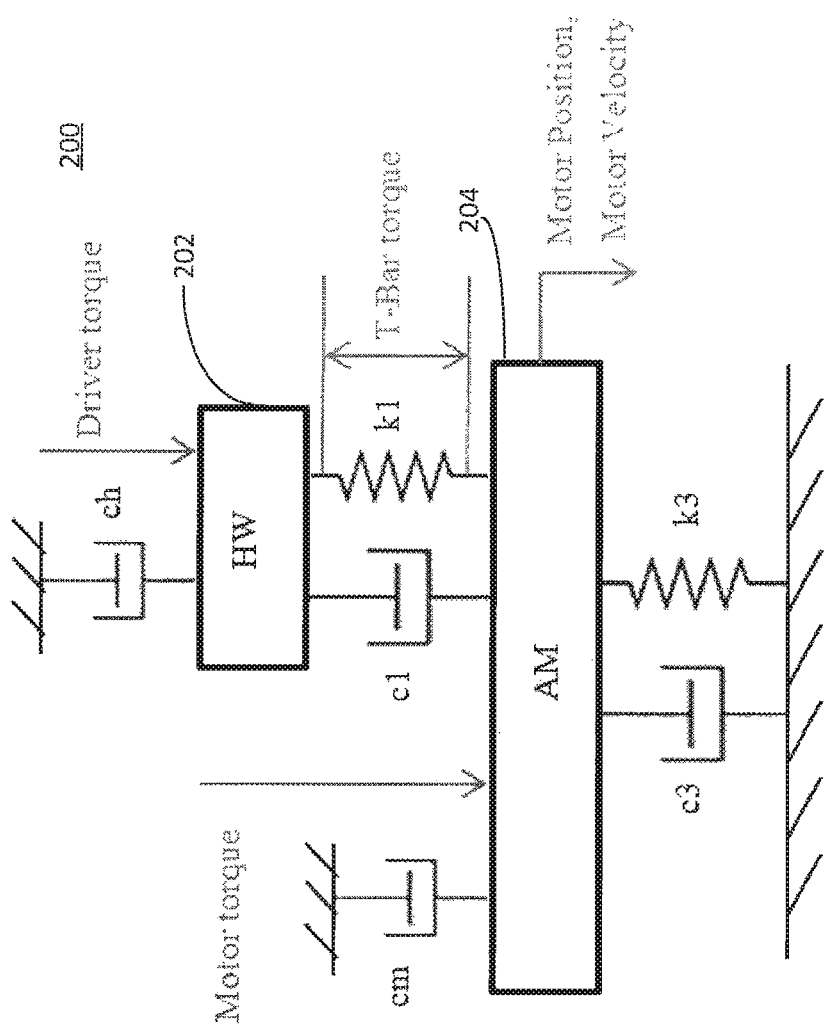
FIG. 2 illustrates a two-mass model as applied to a power steering system.

FIG. 2 illustrates a two-mass model 200 of an electric power steering (EPS) system. EPS can be represented as a linear system model consisting of two inertia components: Handwheel (HW) 202 and Assist-mechanism (AM) 204. The AM 204 may represent combined motor and rack inertia in a typical EPS gear.

As shown in FIG. 2, the two-mass model may include two inputs, a motor torque and driver torque. The three outputs of the two-mass model may include T-Bar torque (HWT), motor position ($\theta_m$) and motor velocity ($\omega_m$). HWT is the torque across the torsion spring k1. In this two-mass mass mechanical system, there would in total four states in the system, two for each of the inertias. The four states of the system are handwheel position ($\theta_{hw}$), handwheel velocity ($\omega_{hw}$), assist-mechanism position ($\omega_{am}$), and assist-mechanism velocity ($\omega_{am}$). Motor torque ($T_m$) is a control input for the system, while driver torque ($T_d$) is a disturbance input for the system. The amount of motor torque to be applied is decided by various internal EPS algorithms and therefore is a known quantity. The internal motor control loop ensures that the motor torque generated by the motor is same as the motor torque command.

Figure 3:
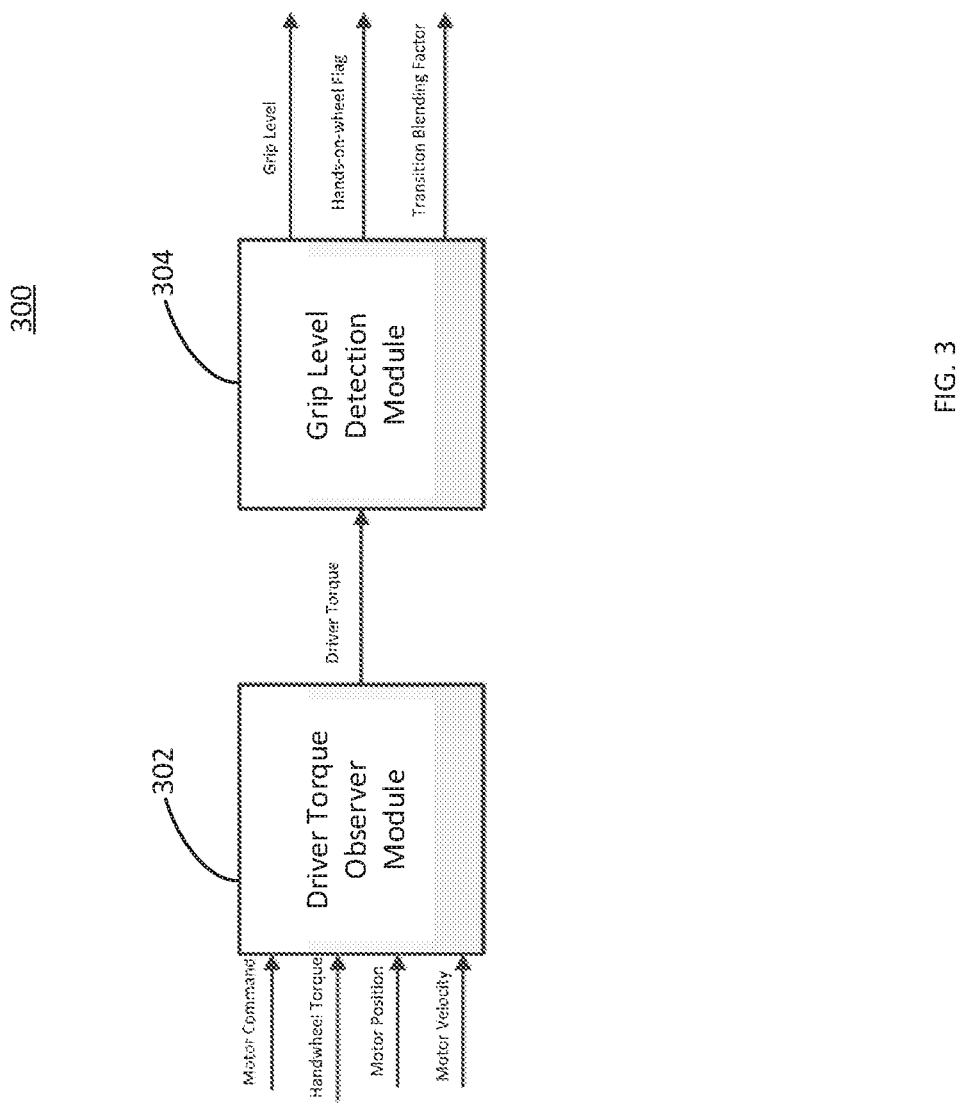
FIG. 3 illustrates a hands-on wheel detection module in accordance with some embodiments.

FIG. 3 illustrates a Hands-On-Wheel Detection module 300 of the control module 50 of FIG. 1. In various embodiments, the control module 50 can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, or other suitable components that provide the described functionality. As can be appreciated, the module shown in FIG. 3 may be further partitioned.

Inputs to the control module 50 may be generated from the torque sensor 31 (FIG. 1) of the vehicle 10 (FIG. 1) as well as the motor position/velocity sensor 32. In addition, the inputs may be received from other control modules (not shown) within the vehicle 10 (FIG. 1), and may be modeled or predefined. Alternatively, the control module 50 may receive handwheel position/velocity signals from the handwheel position/velocity sensor 33. The handwheel position/velocity signals are scaled to motor coordinates, instead of these signals being directly provided by motor position/velocity sensor 32.

In FIG. 3, the Hands-On-Wheel Detection module 300 may include a Driver Torque Observer module 302 and a Grip Detection module 304. As described in more detail below, the driver torque observer may use an augmented two-mass module to generate an estimate of driver torque, instead of receiving driver torque as an input. The estimate of driver torque is indicative of a driver torque state.

The Driver Torque Observer module 302 may receive as inputs a motor command, handwheel torque, motor position, and motor velocity. If the amount of driver torque in the system can be estimated, then a prediction can be made as to whether the driver is touching the steering wheel.

In the two mass model, the physical parameters ($J_{hw}$, $J_{am}$, k1, k3, c1, c3, ch and cm) can be either measured or estimated by doing frequency response based system identification and collecting data from an EPS gear. The linear equations for the above model can be written as follows:)

$$\dot{x} = A_p x + B_p u$$

$$y = C_p x + D_p u \quad (1)$$

Where x represents the 4 states of plant, y is the measured outputs and u represents the inputs to the plant. These matrices are illustrated below:

$$x = \begin{bmatrix} \theta_{hw}; \\ \omega_{hw}; \\ \theta_{am}; \\ \omega_{am} \end{bmatrix}$$

$$u = \begin{bmatrix} T_d; \\ T_m \end{bmatrix}$$

$$y = \begin{bmatrix} HWT; \\ \theta_m; \\ \omega_m \end{bmatrix}$$

For the EPS two mass model, the matrices $A_p$, $B_p$, $C_p$ and $D_p$ are as follows.

$$A_p = \begin{bmatrix} 0 & 1 & 0 & 0; \\ -\frac{k1}{jh} & -\frac{(c1+ch)}{jh} & \frac{k1}{jh} & \frac{c1}{jh}; \\ 0 & 0 & 0 & 1; \\ \frac{k1}{jm} & \frac{c1}{jm} & \frac{-(k1+k3)}{jm} & \frac{-(c1+c3+cm)}{jm} \end{bmatrix}$$

$$B_p = \begin{bmatrix} 0 & 0; \\ \frac{1}{jh} & 0; \\ 0 & 0; \\ 0 & \frac{1}{jm} \end{bmatrix}$$

$$C_p = \begin{bmatrix} k1 & 0 & -k1 & 0; \\ 0 & 0 & 1 & 0; \\ 0 & 0 & 0 & 1 \end{bmatrix}$$

$$D_p = \begin{bmatrix} 0 & 0 & 0 & 0; \\ 0 & 0 & 0 & 0 \end{bmatrix}.$$

Matrix $B_p$ is disturbance input matrix, which can be split into two smaller matrices one representing the input matrix for driver torque ($B_d$=Disturbance input matrix). Matrix $B_t$ is a control input matrix representing the input matrix for motor torque ($B_t$=control input matrix).

$$B_t = \begin{bmatrix} 0; \\ 0; \\ 0; \\ \frac{1}{jm} \end{bmatrix}$$

$$B_d = \begin{bmatrix} 0; \\ \frac{1}{jh}; \\ 0; \\ 0 \end{bmatrix}$$

The Driver Torque Observer module 302 predicts $T_d$ using an augmented two-mass model EPS system, to provide a fifth state $T_d$. In the original model, as represented by equation 1, $T_d$ was considered as a disturbance input. In the augmented two-mass model, it is considered as a disturbance state. In order to augment $T_d$ as a state to existing equation 1, a state equation for $T_d$ is used by the two-mass model. In one embodiment, the augmented two-mass model uses the following state equation under the assumption that $T_d$ does not change rapidly, and that values of $T_d$ at low frequencies are relevant to the augmented two-mass model.
(Equation 2)

$$\dot{T}_d = 0 \quad (2)$$

However, it is to be appreciated that other embodiments are contemplated by the subject application that include a rate of change for $T_d$ that results in a non-zero derivate value. Accordingly, the derivative of $T_d$ as represented by equation 2 will be non-zero. It can be appreciated that by augmenting equation 1 with equation 2, a five-state system. The five-state system is used by the Driver Torque Observer module 302. The equations for the augmented system are as follows:

$$\dot{x}_{aug} = A_{aug} x_{aug} + B_{aug} u_{aug} \quad (3)$$
$$y = C_{aug} x_{aug} + D_{aug} u_{aug}$$

$$x_{aug} = \begin{bmatrix} \theta_{hw}; \\ \omega_{hw}; \\ \theta_{am}; \\ T_d \end{bmatrix}$$

$$u_{aug} = [T_m]$$

The four matrices $A_{aug}$, $B_{aug}$, $C_{aug}$ and $D_{aug}$ are as follows:

$$A_{aug} = \begin{bmatrix} A_p & B_d \\ 0 & 0 \end{bmatrix};$$

$$B_{aug} = \begin{bmatrix} B_t \\ 0 \end{bmatrix};$$

$$C_{aug} = [C_p \, 0];$$

$$D_{aug} = 0.$$

The five-state system described above has an observer can be built to estimate all five states of the system. In that case one of the states estimated by the observer will be driver torque ($T_d$).
The standard observer equations are as follows:

$$\dot{\tilde{x}}_{aug} = A_{aug} \tilde{x}_{aug} + B_{aug} u_{aug} + L(y - \tilde{y})$$

$$\tilde{y} = C_{aug} \tilde{x}_{aug} + D_{aug} u_{aug} \quad (4)$$

The observer matrix L can be found out using LQE (Linear quadratic estimator) or Kalman filter approach by assigning weights on disturbance inputs and noise on measured outputs. The disturbance inputs and the corresponding disturbance input matrix to the system are defined, in one embodiment, as shown below. It is to be appreciated that the disturbance inputs and the disturbance input matrix can be of any suitable form(s), and not limited in form of content to the examples provided below:

$$\text{Disturbance inputs } d = \begin{bmatrix} \dot{T}_d \\ T_m \end{bmatrix}$$

$$\text{Disturbance input matrix } G = \begin{bmatrix} 0 & B_t \\ 1 & 0 \end{bmatrix}$$

The measurements for the EPS system are HWT, $\theta_m$ and $\omega_m$ which constitute the vector y. L matrix is calculated by assigning relative weights to each of the disturbance inputs and noises for each of the measurements. The disturbance and noise weighting matrices are as follows in one embodiment:

$$W_{disturbance} = \begin{bmatrix} w_d & 0 \\ 0 & w_m \end{bmatrix}$$

$$V_{noise} = \begin{bmatrix} v_{hwt} & 0 & 0 \\ 0 & v_{pos} & 0 \\ 0 & 0 & v_{vel} \end{bmatrix}$$

As can be appreciated, either or both of $W_{disturbance}$ and $V_{noise}$ matrices can be in another form or structure. Furthermore, the content of the matrices is not limited to the embodiment provided. By assigning different values to $w_d$, $w_m$, $v_{hwt}$, $v_{pos}$ and $v_{vel}$, values of observer matrix L can be varied.

For a particular L matrix observer will estimate values for $T_d$. The driver's hands are considered to be on the steering wheel when the estimated value of $T_d$ remains above a certain tunable threshold value for a certain tunable period of time. Also various driver grip levels can be estimated based on how high is the value of $T_d$ and for what duration of time. High values of $T_d$ for a short duration of time can be considered as a high level of grip and can indicate higher urgency from the driver, while a small value of $T_d$ for a longer period of time might indicate a weak grip. Various such tunable levels of grip can be obtained from the algorithm.

The weighting matrices ($W_{disturbance}$ and $V_{noise}$) can be optimized so as to produce a suitable matrix L which can help in accurate and repeatable hands on steering wheel detect, and avoid causing and false detects.

The Driver Torque Observer module 302 outputs a driver torque estimate to the Grip Detection module 304. The Grip Detection module 304 is configured to output a grip level, a hands-on-wheel flag and a transition blending factor to a control module of the EPS system. The transition blending factor may facilitate a transition of the power steering system from a position control mode to a torque control mode. Position control mode may be a mode where control is provided by an ADAS with no driver control or limited driver control of the handwheel. Torque control mode is a mode where a driver applies torque to the handwheel to steer the vehicle.

Figure 4:
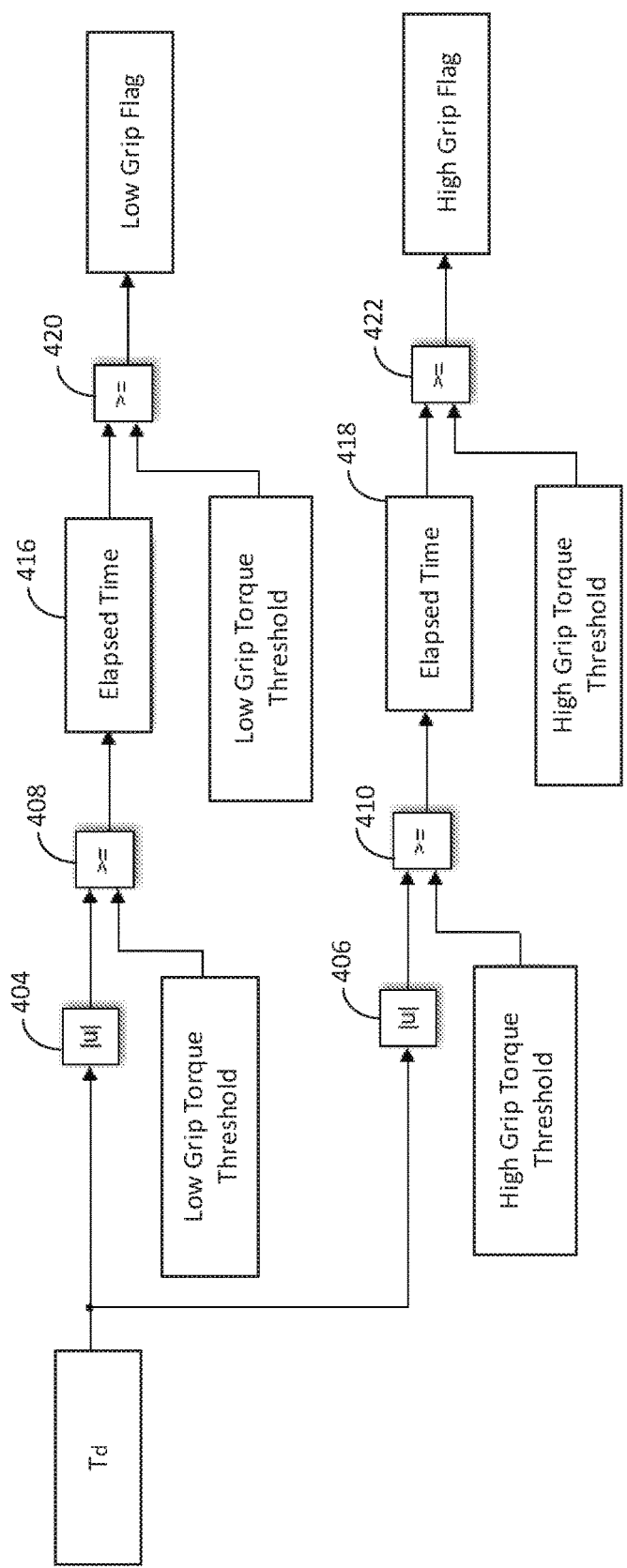
FIG. 4 illustrates a grip level detection module in accordance with some embodiments.

FIG. 4 illustrates the Grip Detection module 304 in more detail. The Grip Detection module 304 receives the driver torque estimate as an input, and outputs including a Low Grip Flag and a High Grip Flag are generated by the Grip detection module. In some embodiments, an absolute value of Driver Torque is determined at respective absolute value blocks 404, 406. At threshold evaluation blocks 408, 410, the magnitude of estimated driver torque is compared to a low grip torque threshold and a high grip torque threshold. In some embodiments, the outputs of threshold evaluation blocks 408, 410 are sent to respective timer blocks, where the timer blocks 416, 418 monitor the length of time that threshold evaluation blocks 408, 410 output a logical value (e.g. logic 1 value). The timer blocks 416, 418 may output a logic 1 value, for example, during which time the outputs of the timer blocks 416, 418 are compared to a low grip time threshold and a high grip time threshold at time comparator blocks 420, 422. The time comparator blocks 420, 422 respectively output a low grip flag and a high grip flag, depending on whether the low grip time threshold and high grip time threshold is exceeded. The Grip Level detection module outputs the grip level and the HOW Flag as a function of Low Grip Flag and High Grip Flag. Table 1 shows an example of the relationship between Low Grip Flag, High Grip Flag, Grip Level, and HOW Flag.

TABLE 1

| Low Grip Flag | High Grip Flag | Grip Level | HOW Flag |
| --- | --- | --- | --- |
| 0 | 0 | 0 | 0 |
| 1 | 0 | 1 | 1 |
| 0 | 1 | 2 | 1 |
| 1 | 1 | 2 | 1 |

As shown in Table 1, the Grip level is dependent on the low grip flag and the high grip flag. The HOW Flag is also dependent on the low grip flag and the high grip flag. Although a Low Grip Flag, High Grip Flag and their respective low grip/high grip time thresholds are described above, it is to be appreciated that any number of flags, thresholds and/or timers can be used by the Grip Detection module 304.

Figure 5:
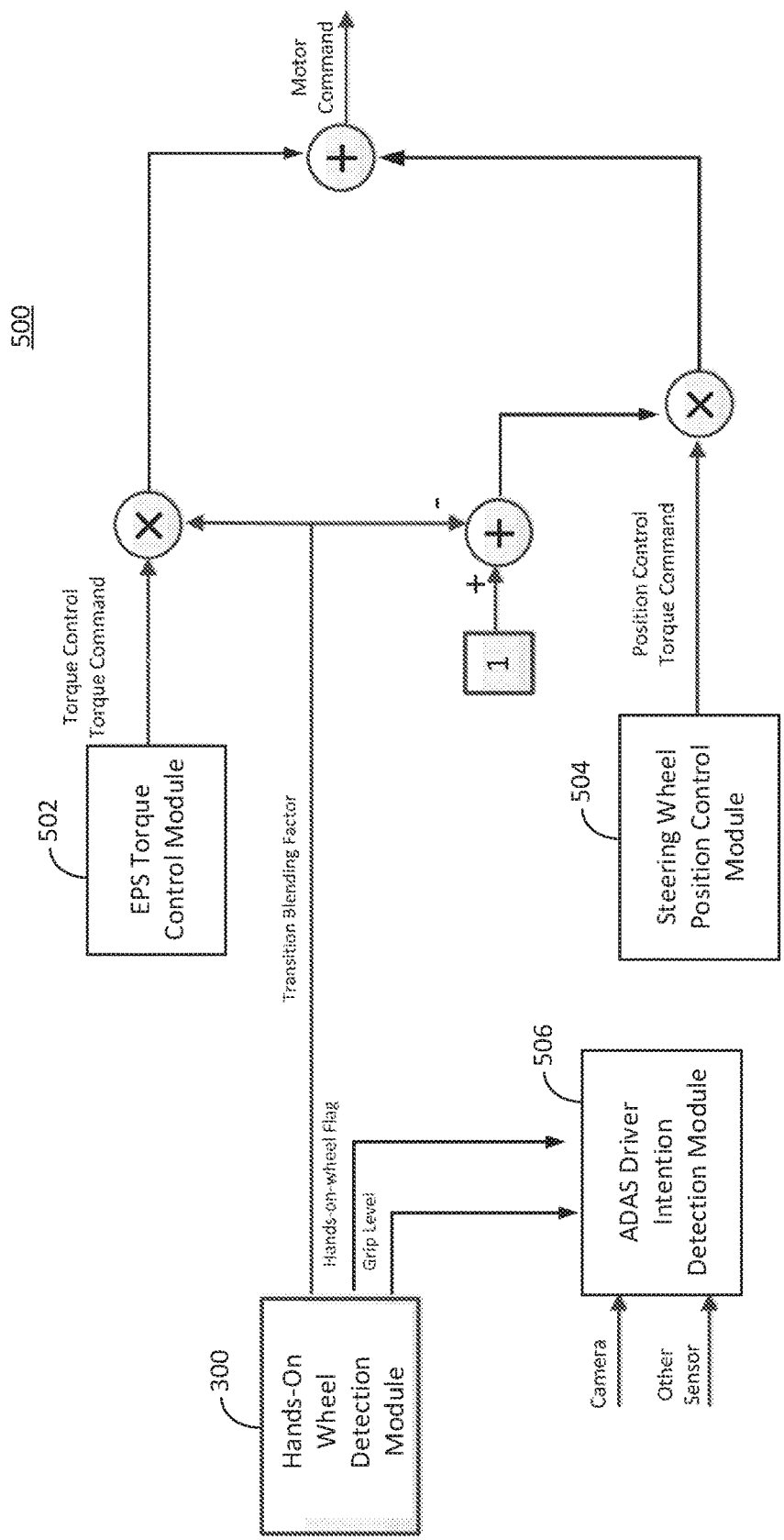
FIG. 5 illustrates an advanced driver assistance system that includes the hands-on wheel detection module in accordance with some embodiments.

FIG. 5 shows the Hands-On-Wheel Detection module 300 implemented along with an advanced driver assistance system in an automated EPS system 500. The transition blending factor is output to EPS torque controller 502 and the steering wheel position control 504. The hands-on-wheel flag and the grip level are output and processed by the ADAS Driver Intervention Center 506, which also receives visual information from a camera mounted on the outside of the vehicle, for example. The ADAS Driver Intervention Center 506 also receives sensory information from a number of other sensors tied to the vehicle.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A system for detecting handwheel control of a power steering system, the system comprising:
    a driver torque estimation module that estimates a driver torque state based on a plurality of electric power steering signals;
    a grip detection module that determines one of a grip level, a hands-on wheel flag, and a transition blending factor from the driver torque state, the transition blending factor facilitates a transition of the power steering system from a position control mode to a torque control mode; and
    a low pass filter that filters the hands-on wheel flag to generate the transition blending factor.

2. The system of claim 1, wherein a high grip flag is determined from the driver torque state, the high grip flag is determined at least in part by comparing a magnitude of the driver torque state to a high grip torque threshold.

3. The system of claim 2, wherein a low grip flag is determined from the driver torque state, the low grip flag is determined at least in part by comparing the magnitude of the driver torque state to a low grip torque threshold.

4. The system of claim 1, wherein the driver torque estimation module includes an augmented two mass model that is configured to provide the driver torque state.

5. The system of claim 4, wherein the plurality of electric power steering signals includes at least one of a motor command, a handwheel torque, a motor position and a motor velocity.

6. The system of claim 1, wherein the grip level indicates a level of grip placed on the handwheel by the driver.

7. A detection system for detecting driver handwheel control of a power steering system, the detection system implemented in an advanced driver assistance system, the detection system comprising:
    a driver torque estimation module that estimates a driver torque state based on a plurality of electric power steering signals;
    a grip detection module that determines one of a grip level, a hands-on wheel flag, and a transition blending factor from the driver torque state, the transition blending factor facilitates a transition of the power steering system from a position control mode to a torque control mode; and
    a low pass filter that filters the hands-on wheel flag to generate the transition blending factor.

8. The system of claim 7, wherein a high grip flag is determined from the driver torque state, the high grip flag is determined at least in part by comparing a magnitude of the driver torque state to a high grip torque threshold.

9. The system of claim 8, wherein a low grip flag is determined from the driver torque state, the low grip flag is determined at least in part by comparing the magnitude of the driver torque state to a low grip torque threshold.

10. The system of claim 7, wherein the driver torque estimation module includes an augmented two mass model that is configured to provide the driver torque state.

11. The system of claim 10, wherein the plurality of electric power steering signals includes at least one of a motor command, a handwheel torque, a motor position and a motor velocity.

12. The system of claim 7, wherein the grip level indicates a level of grip placed on the handwheel by the driver.

13. A method for detecting handwheel control by a driver using a power steering system, the method comprising:
    estimating a driver torque state based on a plurality of electric power steering signals;
    determining one of a grip level, a hands-on wheel flag, and a transition blending factor from the driver torque state, the transition blending factor facilitates a transition of the power steering system from a position control mode to a torque control mode; and
    filtering the hands-on wheel flag to generate the transition blending factor.

14. The method of claim 13, wherein a high grip flag is determined from the driver torque state, the high grip flag is determined at least in part by comparing a magnitude of the driver torque state to a high grip torque threshold.

15. The method of claim 14, wherein a low grip flag is determined from the driver torque state, the low grip flag is determined at least in part by comparing the magnitude of the driver torque state to a low grip torque threshold.

16. The method of claim 13, further comprising providing the driver torque state with an augmented two mass model that is configured to provide the driver torque state.

17. The method of claim 13, wherein the plurality of electric power steering signals includes at least one of a motor command, a handwheel torque, a motor position and a motor velocity.

* * * * *